Nov. 30, 1954     A. L. RICHE     2,695,626
FLOAT VALVE MECHANISM
Filed March 14, 1951
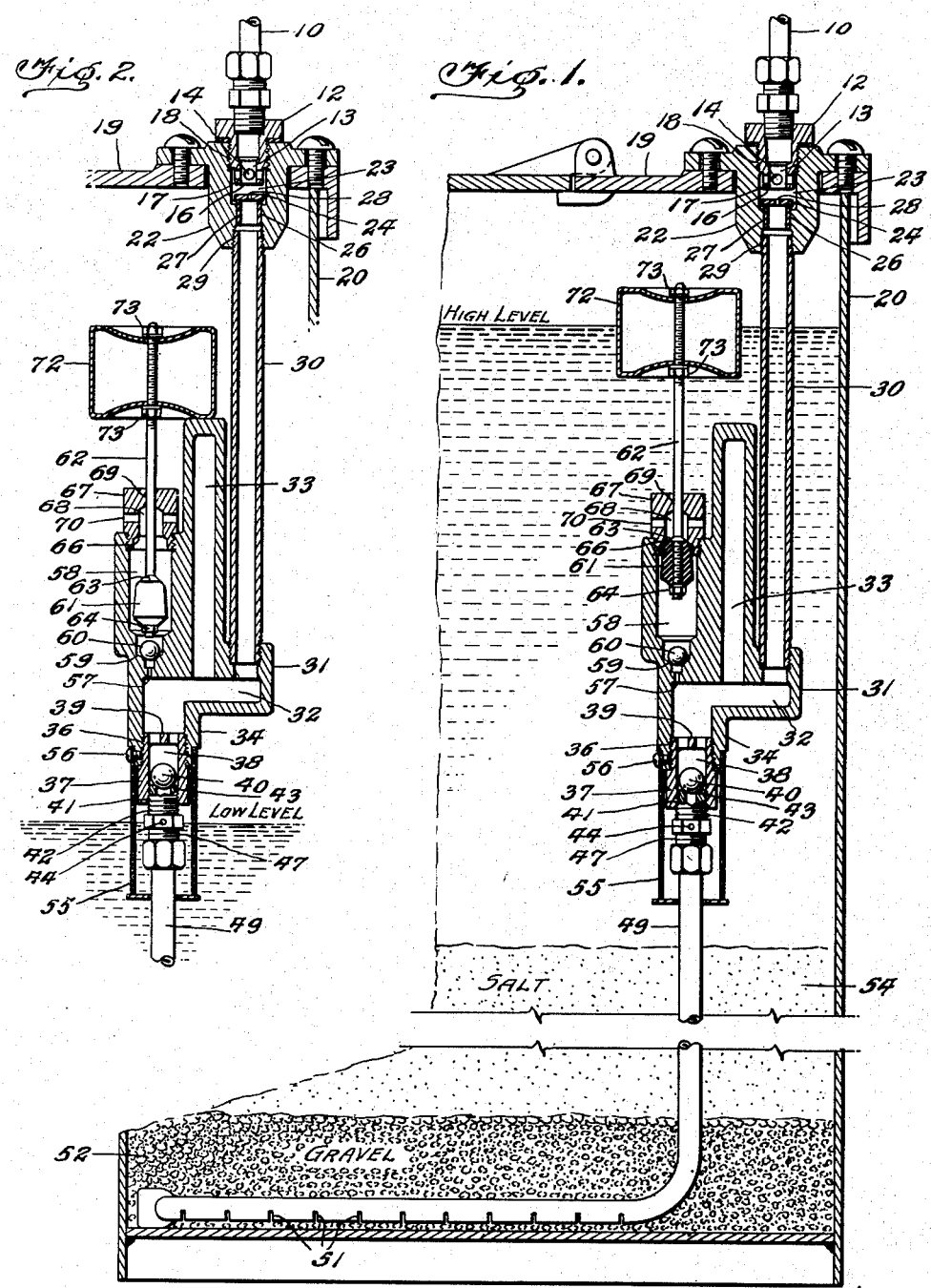
Inventor
Arthur L. Riche
By McCanna and Morsbach
Attorneys

United States Patent Office 2,695,626
Patented Nov. 30, 1954

2,695,626

FLOAT VALVE MECHANISM

Arthur L. Riche, Freeport, Ill., assignor to Automatic Pump & Softener Corporation, Rockford, Ill., a corporation of Illinois Application March 14, 1951, Serial No. 215,455

6 Claims. (Cl. 137—391)

This invention relates to a float valve mechanism and more particularly to a valve mechanism intended primarily as a brine refill valve for base exchange water softeners.

An important object of the inventiton is the provision of a float valve mechanism adapted for attachment to a single pipe line having separate inlet and outlet ports and novel means for controlling the flow therethrough to and from said pipe line.

A further object is the provision of a float valve mechanism arranged for immersion in the liquid of a tank or the like and for connection to an ejector for drawing liquid from the tank, the mechanism having separate inlet and outlet connections into the tank wherein air is admitted to the mechanism to terminate flow out of the tank through the inlet and a float valve controls the flow of liquid into the tank through the outlet.

A still further object is the provision of a valve for use in the brine tank of a base exchange water treating system wherein the valve admits brine into the pipe line when a suction exists in the pipe line until a lower brine level is reached to expose an air vent terminating the flow, and subsequently, raw water is delivered through an elevated outlet of the valve to provide a strata of raw water above the brine in the tank until a float controlled valve stops the flow.

Further objects will be apparent from the following specification, appended claims and drawings thereof forming a part of this application in which:

Figure 1 is a vertical sectional view of a valve mechanism constructed in accordance with this invention showing its use in the brine tank of a conventional base exchange water softener, the ports being shown in the position occupied when the brine level has reached its upper level; and Fig. 2 is a similar view at the beginning of a refill operation.

While the invention may be susceptible of other use, it is herein shown and described as used in the brine tank of a base exchange water treatment apparatus. In such systems the base exchange mass becomes exhausted after a period of usage and must be regenerated to restore its water treating properties. In the performance of this regenerating operation, a brine solution is passed through the mass and thereafter this brine solution is rinsed from the base exchange material to restore it to service condition.

The brine is commonly made up in a brine tank and the brine is drawn from the tank to the water treatment tank by means of an ejector connected to the brine tank by a conduit which also serves to conduct water back to the brine tank for refilling the same.

This invention pertains to an automatic valve mechanism for controlling the flow of the brine and make up water into and out of the brine tank. Referring to the drawings, a tubing 10 is connected to the main central valves of a conventional base exchange softener and provides the conduit for the passage of brine from the tank, and also for the passage of water to the tank for make-up purposes.

Tube 10 is secured to the float valve mechanism through a bushing 12 having an axial passage 13, radial ports 14, and a valve seat 16 formed on the end of the reduced stem 17. Bushing 12 is screwed into a socket 18 formed in boss 22 of the valve mechanism which acts to support the valve mechanism on a cover 19 of a brine tank 20.

The boss 22 has a bore 23, which provides a chamber for free axial movement of a free floating disk valve 24. A bushing 26 is pressed into a bore 27 formed in the boss, the upper end of the bushing providing a seat for the valve disk 24. When there is a flow of liquid in the tubing 10 in a direction out of the brine tank, valve 24 is lifted from the bushing 26 and engages the seat 16 under which condition there is clearance for the free passage of brine from the bushing 26, through the valve chamber 23, around the disk 24 and through the ports 14 to the tube 10. The disk 24 has a central orifice 28 formed therein so that when the disk is seated on the bushing 26, a restricted flow of water may pass therethrough from tube 10 to the brine tank as make-up water. The boss 22 is threaded as at 29 to receive one end of a pipe 30 which extends down into the brine tank. A valve body 31 is threaded onto the lower end of pipe 30 and has a central chamber 32 formed therein which communicates with the pipe 30 and an air chamber 33 communicating with the chamber 32 to cushion any sudden impacts which may cause water hammer as the valves close suddenly.

The body has a depending boss 34 provided with a threaded socket 36 and includes a bushing 37 received in the socket and in which a valve chamber 38 is formed carrying ball valve 40. A spider 39 in the upper end of the bushing retains the ball within the chamber. The lower end of the bushing is threaded at 41 to receive a ported ball seat member 42 having a valve seat 43 formed on its upper extension. An air vent 44 is provided by a small hole extending through the seat member 42 and communicating with the port. A threaded lower extension 47 on the seat member is connected to the upper end of a brine suction tube 49 which extends downwardly to the bottom of the brine tank in the usual manner and has intake slots 51 or other openings to admit brine from below a gravel bed or the like 52. As water from the upper part of the tank moves downwardly toward the intakes 51 in the pipe 49, it passes through a bed of salt 54 to form a brine solution, and through the gravel bed to collect any foreign material which may be carried toward the intakes 51.

A screen 55 is provided surrounding the member 42 having an open bottom through which the tube 49 passes. The screen is held in place by one or more screws 56 passing into the boss 34. The tubular screen is of such length as to terminate below the lower level to which the brine may be drawn during regeneration and acts to prevent solid particles from being drawn into the opening 44.

An orifice 57 is disposed in the upper wall of chamber 32, and opens into a valve chamber 58 which has different diameters to form a valve seat 59 for a ball check valve 60 and a clearance area for a fuller ball valve 61, carried on the lower end of a float rod 62. Valve member 61 is held in place on the threaded end of the float rod 62 between a washer 63 and nut 64, and in its uppermost position, this valve member engages a seat 66 formed in a plug 67.

The seat 66 defines a float controlled port and is formed about the entrance to the axial passage 68 which terminates in a clearance passage 69 to receive and guide the float rod 62 in its vertical movement. A distributor comprising radial ports 70 provides horizontal outlets from the passage so that water delivered from these ports will be deflected laterally of the brine tank. A float 72 is secured to the upper end of the float rod 62 by nuts 73 on the threaded upper end of the stem.

The valve of this application, while not necessarily limited to such use, is designed primarily for use in the brine tank of a base exchange water treatment system. In such systems utilizing a tank for holding brine or other regenerant the regenerant is commonly supplied to the water treatment tank by applying a sub-atmospheric pressure to a conduit leading to the regenerant tank, the usual means being a conventional ejector. Such systems are provided with a valve or valves for effecting the regeneration cycle which function to place the ejector into communication with a conduit to the brine tank and at some phase in the cycle to place this conduit in communication with a source of water pressure for the purpose of refilling the reagent tank. The pipe 10 shown in the drawings is such a conduit and is connected to the float valve mechanism at the boss 22. When the valves of the system are placed in the regenerating or brining position the ejector is in communication with the conduit 10 and produces within this conduit a sub-atmospheric pressure. As a result, liquid passes down through the salt bed into the intake pipe 49 and as it passes up through this pipe, lifts the ball valve 40 to pass up through the chamber 32 and the pipe 30. As the brine moves into the pipe 10 the disk 24 is lifted so that the brine may pass freely through the chamber and into the openings 14. The disk 24 is of substantially smaller size than the chamber to allow an adequate flow of brine therethrough. When the level of the liquid in the tank reaches the vent hole 44, air is admitted into the valve mechanism through this vent in quantity sufficient to supply the requirements of the ejector and the brine ceases to flow in spite of the fact that the ejector may continue in operation. It will be observed however that as the level of the liquid in the tank falls, the float 72 will move down with it until it rests upon the upper side of the body above the chamber 33 as shown in Fig. 2, and in the course of this movement the fuller ball 61 is moved to unseated position. However, the ball check valve 60 prevents liquid from being drawn into the chamber 32 from the chamber 58.

In a subsequent step of the regeneration cycle, water pressure is applied to the pipe 10 in excess of atmospheric pressure. As the water moves down into the pipe 30 and past the disk 24 the disk is seated against the upper end of the bushing 26 limiting the flow of water passing to the pipe 30 to the volume which can pass the orifice 28 of the disk. As the pressure builds up in the pipe 30 and the chamber 32 the ball valve 40 closes against its seat to prevent the entrance of water to the tank by way of the pipe 49. The incoming water passes through the orifice 57 and lifts the inlet ball valve 60 passing up through the chamber 58 past the fuller ball 61 and out through the radial openings 70. The level of the liquid in the tank rises and ultimately starts to buoy up the float 70 from the position shown in Fig. 2 raising the fuller ball 61 until the level of the liquid reaches that shown in Figure 1 whereupon the fuller ball is drawn against its seat by action of the float to terminate the introduction of refill water. Since the fuller ball 61 closes against its seat in the direction of water flow, there is a tendency for the valve to snap shut toward the end of its movement and thereby produce water hammer. The effect of this action is substantially eliminated by the provision of the chamber 33 which, it will be observed, is filled with air during each operating cycle of the valve mechanism. The air in this chamber absorbs the sudden change in pressure which may be occasioned by closing of the valve member 61. The presence of the disk 24 also functions in obtaining this result since it limits the rate of flow through the valve mechanism. This, however, serves a further function by limiting the rate of flow through the chamber 58 to a point at which there is no substantial tendency for the water flowing through this chamber to lift the fuller ball 61 and associated parts until the level of the liquid in the tank has substantially reached its upper level.

It will be observed that this valve mechanism operates in such manner that the brine is drawn out from the bottom of the tank and that fresh water is introduced at the top of the tank. Consequently, the brine contained within the tank is covered with a layer of fresh water. As a result there is no creepage of salt upward along the walls of the tank with the resultant corrosion and interference with operation of the valve mechanism. It will also be observed that the valve mechanism is substantially completely immersed within the liquid in the tank, a substantial part of which is nearly salt free so that crystallized salt does not interfere with the operation of the movable parts of the valve mechanism.

I claim:

1. A float valve mechanism comprising a valve body having a chamber arranged for communication with a pipe for the passage of liquid to and away from the valve mechanism, an inlet port to the chamber, means for connecting the inlet port to a conduit leading downwardly therefrom into a liquid surrounding the valve mechanism, a check valve operative to prevent flow outwardly through the inlet port from said chamber, an outlet port from said chamber, another check valve operative to prevent flow into the chamber through the outlet port, a float controlled port disposed between the outlet port and the exterior of the body, a float valve member operative to close said float controlled port and operative to move away from said float controlled port to open the same for controlling flow through the float controlled port, a float connected to said float valve member to open the float controlled port in response to lowering of the float from a predetermined upper level of liquid surrounding the valve mechanism and close the float controlled port in response to movement of the float upwardly to said predetermined level, and means for admitting air to said chamber at a preselected lower level of the liquid surrounding the valve mechanism.

2. A float valve mechanism comprising a valve body having a chamber constructed and arranged for communication with a pipe for the passage of liquid to and away from the valve mechanism, an inlet port in the body communicating with the chamber, means for connecting the inlet port to a conduit leading downwardly therefrom into a liquid surrounding the valve mechanism, a check valve at the inlet port to prevent flow outwardly through the inlet port from said chamber arranged to open for the passage of liquid from said conduit into the chamber in response to reduced pressure in said pipe, an outlet port from said chamber, another check valve at the outlet port to prevent flow through the outlet port into the chamber arranged to open in response to elevated pressure in said pipe, a float controlled port disposed between the outlet port and the exterior of the body, a float valve member positioned to cooperate with the float controlled port, a float outside the valve body connected to the float valve member to open the float controlled port in response to lowering of the float from a predetermined upper level of liquid surrounding the valve body and close the float controlled port in response to movement of the float upwardly to said predetermined level, means for admitting air to said chamber at a preselected lower level of liquid surrounding the valve mechanism to terminate flow of liquid through said conduit to said pipe, and means for regulating the rate of flow between the chamber and the pipe dependent upon the direction of flow.

3. The combination recited in claim 1 wherein the valve mechanism is provided with an air chamber in communication with the chamber in the body positioned to trap air therein to cushion water hammer occasioned by rapid closing of the float controlled port.

4. The combination recited in claim 1 including a screen for preventing the entrance of scum or larger solid particles into the means for admitting air to the chamber of the valve body.

5. A float valve mechanism comprising a valve body having a valve cavity and a chamber arranged for communication with a pipe for the passage of liquid to and away from the valve mechanism, an inlet port in the body communicating with the chamber, means for connecting the inlet port to a conduit leading downwardly therefrom into a liquid surrounding the valve mechanism, a ball check valve disposed above the inlet port to seat by gravity downwardly thereover and prevent flow outwardly therethrough from said chamber, and to unseat in response to reduced pressure in said pipe and chamber for the passage of liquid from the conduit into the chamber, an outlet port between said chamber and the valve cavity, a ball check valve disposed in the valve cavity above the outlet port to seat by gravity downwardly thereover and prevent flow therethrough into the chamber and to unseat in response to elevated pressure in the pipe and chamber, a float controlled port disposed between the valve cavity and the exterior of the body, a float valve member in the valve cavity seating over the float controlled port to prevent flow out of the cavity, a float outside the body connected to the float valve member to unseat the float valve member in response to lowering of the float from a predetermined upper level of liquid surrounding the valve mechanism and close the float controlled port in response to movement of the float upwardly to said predetermined level, and means for admitting air to said chamber at a point below the inlet port at a preselected lower level of liquid surrounding the valve mechanism to terminate the flow of liquid through said conduit to said pipe.

6. The combination recited in claim 5 including means for regulating the rate of flow between the chamber and the pipe dependent upon the direction of liquid flow and wherein the flow area of the outlet port is small with respect to the flow area of the valve cavity.

References Cited in the file of this patent

UNITED STATES PATENTS

| Number | Name | Date |
|---|---|---|
| 1,708,916 | Eisenhauer | Apr. 9, 1929 |
| 2,214,064 | Niles | Sept. 10, 1940 |
| 2,280,876 | Zugelter | Apr. 28, 1942 |
| 2,388,268 | Kromhout | Nov. 6, 1945 |
| 2,539,221 | Badeaux | Jan. 23, 1951 |
| 2,556,872 | Deters | June 12, 1951 |